Patented Sept. 3, 1929.

1,727,231

UNITED STATES PATENT OFFICE.

JAMES S. DOWNARD, OF DALLAS, TEXAS.

ASPHALT PAVING COMPOSITION.

No Drawing.    Application filed July 30, 1926. Serial No. 126,100.

This invention relates in general to asphalt compositions particularly adapted for use as pavings or as surfacing for roadways and more particularly relates to a process for incorporation of asphaltum in impalpable powders to produce synthetic rock asphalt and asphalt filler.

In the manufacture of asphalt paving mixtures consisting of about 90% mineral aggregate, such as sand or stone, and 10% asphaltic cement and wherein a hot aggregate is incorporated with the melted asphalt by mechanical mixing, it is the usual practice and, in fact, necessary to add a fine, mineral dust, such as Portland cement, pulverized lime-stone, chalk or shale or amorphous carbonate of lime to temper and water-proof as well as to increase the density and close texture of the paving mixture and to protect the composition by forming a mineral coating saturated with asphalt around the particles of asphalt which coat the aggregate. This fine mineral dust is usually designated as filler and ordinarily is so fine that 85% will pass a 200 mesh screen or bolting cloth and when thrown into water will not settle for a considerable time. The advantages of asphalt paving compositions having such a filler incorporated therein are well recognized but the disadvantage of the use of fillers of this nature resides in the difficulties encountered in properly incorporating the filler in the composition. The ordinary practice is to heat the sand or other aggregate, melt the asphalt and incorporate the heated sand and asphalt, in a suitable mixer, the operation of which in itself requires the expenditure of a considerable amount of power. When the sand grains have become coated with asphalt the filler is poured in and as it is in the form of fine dry dust it tends to and does collect in pockets or balls around which the asphalt forms a protecting coating. In many instances the balls are as large as or larger than marbles. These balls resist the action of the mixing blades for a considerable time and often when apparently the asphalt and filler are thoroughly incorporated the balls still exist and the distribution of the filler through the asphalt remains incomplete. This renders the compound defective and in order to avoid such defects the mixing is usually carried on for a long period with the incident disadvantage of considerable expense.

The object of the present invention is to provide the filler in such form and to incorporate the filler in the asphalt composition in such a manner that its proper admixture with the composition is assured while the necessity of long mixing is avoided. By facilitating the incorporation of the filler in the asphalt composition the advantages of an asphalt paving compound having a filler incorporated therein are attained and the previously existing disadvantages in connection with the incorporation of the filler are avoided.

Another object is to provide a process of the character described which facilitates the production of a synthetic rock asphalt.

In carrying out the present invention the fine mineral dust which constitutes the filler and which may be Portland cement, pulverized limestone, chalk, or shale or amorphous carbonate of lime, is mixed with the melted asphalt in the presence of water heated to a temperature higher than and preferably slightly above the melting point of the asphalt being so mixed. This process may be carried out either by first wetting the filler, that is the fine mineral dust with boiling water and discharging it into a mixer or grinding mill wherein the asphalt is sprayed into the commingled heated water and filler or is atomized thereinto with a jet of air. The grinding mill or mixer is equipped with means for heating the same such as steam jacket or a gas flame thereunder and it also has suitable means for stirring or macerating the asphalt and effecting therethrough incorporation of the dust and asphalt. During the time that the asphalt and the wet filler are subjected to the mixing action they are maintained above the melting point of the asphalt. The feature of mixing the asphalt and fine mineral dust in the presence of boiling water or water heated to a temperature higher than the melting point of the asphalt greatly facilitates the proper admixture of the filler and asphalt without the necessity of prolonged mixing and without the expenditure of any considerable amount of power. After the mixing operation has been completed the asphalt, water and dust are in the form of paste with the asphalt incorporated in the filler. Any desired amount of asphalt may be incorporated with any desirable percentage of mineral matter without losing any of the advantages mentioned. If an ordinary paving composition is to be manufactured sufficient asphalt is added to thoroughly coat and impregnate and to some extent at least saturates the fine mineral dust. The proportion of asphalt and fine mineral dust may be varied as follows: asphalt 7 to 25%, fine mineral dust 93 to 75%. Where synthetic rock or limestone asphalt is to be produced the proportions may vary as follows: asphalt 10% to 18%, filler 90% to 82%. Where mastic is to be produced the proportions vary as follows: asphalt 18% to 32%, filler 82% to 68%.

When the filler is to be utilized in ordinary asphalt paving compound using an aggregate of sand or crushed stone, the filler after being prepared as hereinabove described is dried and prior to its admixture or during its admixture with the sand or other aggregate, is heated. Due to the presence of the asphalt in the filler its incorporation with the aggregate as well as its incorporation with any other asphalt that may be added is greatly facilitated and thorough and complete admixture is had without prolonged and heavy stirring or mixing.

As stated the water in the presence of which the filler and asphalt are mixed, is maintained above the melting point of the asphalt. Of course, the melting points of different asphalts vary over a rather wide range and where the asphalt is of a high melting point it will be necessary to raise the boiling point of the water. This may be conveniently done by adding calcium chloride to the water or taking any other appropriate steps of this nature. If calcium chloride is added the solution after the mixing operation has been completed is treated by the addition of ammonium oxalate, sulphate, phosphate or carbonate or Glauber's salt. The added chemical is in such quantity as will effect the precipitation of substantially all of the calcium contents of the solution. It will not be necessary to heat the solution higher than 360° Fr. Where Glauber's salt is used to neutralize the solution there will be produced a brine of sodium chloride which involves no serious disadvantages where the quantity of the filler used is small.

Another way in which the process may be carried out is to heat the water in the drum and also heat the filler and asphalt separately and feed them into the drum or grinding mill in measured streams or in any other suitable way. In the mill which may be a mortar, ball mill, or Chilean mill, or any other suitable type of grinding, macerating or mixing machine, the asphalt and filler are thoroughly and completely mixed and incorporated in the presence of water and this is accomplished as in the previous instance without the expenditure of any considerable degree of power and without prolonged mixing. It is to be noted that by the present process the filler is incorporated in the asphalt prior to the admixture of the asphalt with the aggregate so that the weight and bulk of the aggregate need not be and is not handled. This of itself has some advantages but the principal advantage resides in the facility with which the filler combines with the asphalt itself and this advantage is believed to be due to the admixture of the filler and the asphalt in the presence of heated water. A filler produced as the result of this process is no longer a fine dust filler but is a filler in an asphaltic state or phase.

From the foregoing it will be seen that the present invention provides a process of preparing a filler for asphalt compounds which consists in mixing melted asphalt and a heated filler consisting of fine mineral dust, such as Portland cement, pulverized limestone, chalk or shale or amorphous carbonate of lime in the presence of water heated to a temperature slightly above the melting point of the asphalt so as to saturate the filler with the asphalt, that is to say, the asphalt is thoroughly incorporated in the filler.

The filler thus produced is novel in itself in that it consists of a fine mineral dust of the composition specified which is saturated with asphalt. The invention also proposes a novel method or process of producing a paving which consists in first preparing a filler in incorporating asphalt and fine mineral dust such as Portland cement or the like, in the presence of heated water, then drying the filler if an ordinary asphalt paving compound is to be produced, pulverizing the filler or cooling it to a granular form, subsequently heating the filler and mixing it with the mineral aggregate and any other asphalt that may be added to the compound. The last heating of the filler may be separate from the heating of the aggregate or may be carried on in the drum in which the aggregate, filler and asphalt are mixed.

While the present invention contemplates as one of its principal features the production of mineral filler in an asphaltic state or phase it is possible to conveniently and easily produce a synthetic rock asphalt having all of the desirable properties of a natural bituminous limestone or natural rock asphalt. To produce this synthetic rock asphalt the process is carried out as hereinabove set forth except that from 10% to 18% of asphalt is provided and 90% to 82% filler. After the filler which is preferably pulverized limestone or amorphous carbonated lime has been thoroughly saturated with the asphalt by grinding, macerating or mixing the asphalt and filler in the presence of water heated to a temperature greater than the melting point of the asphalt the resultant product is dried and pulverized or else reduced to a granular form by powerfully cooling it on sieves. Subsequently the material may be heated or warmed and laid as a pavement either with or without the use of an aggregate.

I claim:

1. The process of manufacturing a filler forming a composition of fine mineral dust and an asphalt, the composition adapted to be shipped in a granular state without forming a mass under normal atmospheric temperatures which comprises thoroughly agitating a fine mineral dust, an asphalt in a melted state, and a quantity of hot water which is sufficient to form a wet paste of the asphalt and the fine dust, then drying the paste and breaking up said paste to provide a ganular product.

2. The process of manufacturing a filler forming a composition of a fine mineral dust and an asphalt, the composition being adapted to be shipped in a granular state without forming a mass under normal atmospheric temperature which comprises dissolving a salt in a quantity of water to form a solution so that when the solution is heated the temperature of the solution may be raised above the temperature of the melting point of an asphalt to be employed, heating the solution to a temperature which is above the melting point of the asphalt to be employed, thoroughly agitating a fine mineral dust, an asphalt in a melted state and a quantity of the hot solution which is sufficient to form a wet paste, then drying the paste and breaking up said paste to provide a granular product.

3. The process of manufacturing a filler forming a composition of fine mineral dust and an asphalt, the composition adapted to be shipped in a granular state without forming a mass under normal atmospheric temperatures which comprises thoroughly agitating a fine mineral dust, an asphalt in a melted state, and a quantity of hot water which is sufficient to form a wet paste while maintaining the temperature of the ingredients above the temperature of the melting point of the asphalt, then drying the paste and breaking up said paste to provide a granular product.

JAMES S. DOWNARD.